United States Patent
Yoshikawa

(10) Patent No.: US 7,328,945 B2
(45) Date of Patent: Feb. 12, 2008

(54) OCCUPANT PROTECTION SYSTEM

(75) Inventor: Hiromichi Yoshikawa, Inukami-gun (JP)

(73) Assignee: Takata Corporation (JP)

( * ) Notice: Subject to any disclaimer, the term of this patent is extended or adjusted under 35 U.S.C. 154(b) by 104 days.

(21) Appl. No.: 11/303,366

(22) Filed: Dec. 16, 2005

(65) Prior Publication Data

US 2006/0138816 A1    Jun. 29, 2006

(30) Foreign Application Priority Data

Dec. 24, 2004  (JP) .............................. 2004-373960
Oct. 25, 2005  (JP) .............................. 2005-310159

(51) Int. Cl.
B60R 21/16   (2006.01)
B60R 21/207  (2006.01)
B60R 21/23   (2006.01)
B60R 21/26   (2006.01)
B60N 2/42    (2006.01)

(52) U.S. Cl. .................................. 297/216.1; 280/730.1

(58) Field of Classification Search ............. 297/216.1; 280/730.1
See application file for complete search history.

(56) References Cited

U.S. PATENT DOCUMENTS

| | | | |
|---|---|---|---|
| 5,695,242 A * | 12/1997 | Brantman et al. ....... | 297/216.1 |
| 6,412,810 B1 | 7/2002 | Wipasuramonton et al. | |
| 6,863,298 B2 * | 3/2005 | Sakai et al. .......... | 297/216.1 X |
| 2004/0100075 A1 * | 5/2004 | Sakai et al. ............. | 280/730.1 |
| 2004/0155436 A1 | 8/2004 | Saiguchi et al. | |
| 2004/0178616 A1 * | 9/2004 | Yoshikawa ................. | 280/748 |
| 2005/0104341 A1 * | 5/2005 | Sakai ..................... | 280/730.1 |
| 2006/0119149 A1 * | 6/2006 | Yoshikawa et al. ...... | 297/216.1 |
| 2006/0175880 A1 * | 8/2006 | Hiruta et al. ............ | 297/216.1 |
| 2006/0267325 A1 * | 11/2006 | Kumagai et al. .... | 297/216.1 X |
| 2007/0046082 A1 * | 3/2007 | Yoshikawa ............... | 297/216.1 |
| 2007/0080527 A1 * | 4/2007 | Itoga et al. .......... | 280/730.1 X |
| 2007/0090633 A1 * | 4/2007 | Hiruta et al. ........ | 297/216.1 X |

FOREIGN PATENT DOCUMENTS

JP          10217818 A      8/1998

OTHER PUBLICATIONS

EPO Search Report 05026771.5 dated May 8, 2006.

* cited by examiner

*Primary Examiner*—Rodney B. White
(74) *Attorney, Agent, or Firm*—Fitch, Even, Tabin & Flannery

(57) ABSTRACT

An occupant protection system is provided in which gas from a gas generator flows through a duct and into an airbag smoothly even with a gas generator that emits a jet of gas in non-axial directions relative to the duct. The airbag disposed under a seat cushion and the gas generator are joined together with the duct. In one form, the duct is fitted on the nozzle of the gas generator, so that the inner circumferential surface of the duct faces gas ports around the side circumferential surface of the nozzle. When the gas generator emits a jet of gas, the gas from the gas generator issues from the gas ports radially relative to the nozzle, and then strikes against the inner circumferential surface of the duct to change in direction, thus flowing along the axis of the duct.

15 Claims, 6 Drawing Sheets (a)

(b)

OCCUPANT PROTECTION SYSTEM

FIELD OF THE INVENTION

The present invention relates to an occupant protection system for protecting an occupant of a vehicle such as a car in the event of a collision and, more particularly, it relates to an occupant protection system that restrains the waist of an occupant to prevent the body of the occupant from moving forward and downward in a front collision.

BACKGROUND OF THE INVENTION

As a system for protecting an occupant in the event of a car collision, Japanese Unexamined Patent Application Publication No. 10-217818 describes an occupant protection system in which an inflatable airbag is disposed between a seat cushion and a seat pan, and the front part of the seat cushion is pushed up by inflating the airbag in a car collision to prevent a submarine phenomenon such that the occupant passes under a lap belt in a front collision, even with a seatbelt in use.

FIG. 6 is a longitudinal sectional view of the occupant protection system of the reference, along the length of the seat. An airbag 44 is disposed between a cushion frame 40 and a seat pad 42 in the front of the seat. The airbag 44 extends along the lateral width of the seat and is inflated by an inflator (gas generator) 46. The upper surface of the seat pad 42 is covered with a trim cover 48, on which an occupant sits.

When the inflator 46 is activated in case of a vehicle collision, the airbag 44 inflates, so that the front part of the seat pad 42 is pushed up or tossed from below to increase in density, thereby preventing the forward movement of the body of an occupant (including restraining).

While the inflator (gas generator) 46 is disposed in the airbag 44 in the reference, the gas generator can be disposed outside the airbag to moderate the heat-resistance requirement for the airbag. In this case, the gas generator and the airbag are joined together with a duct, through which gas from the gas generator is introduced into the airbag.

In joining a gas generator with a duct, the gas generator is preferably of a type having a gas port at the distal end. This type of gas generator generally has the gas port at the side circumferential surface of the distal end. In this case, when the gas generators emit a jet of gas, the gas issues out from the distal end of the gas generators radially, or in non-axial directions relative to the duct, so that the gas flows less smoothly into the depth in the airbag (a portion furthermost from the duct).

SUMMARY OF THE INVENTION

Accordingly, it is an object of the present invention to provide an occupant protection system in which the gas from a gas generator flows into the airbag smoothly even with a gas generator that emits a jet of gas in non-axial directions relative to the duct.

An occupant protection system according to one aspect of the present invention includes an airbag disposed under the front part of a seat cushion and inflatable so as to push the front part of the seat cushion from below; a gas generator that inflates the airbag in an emergency of a vehicle; and a duct that introduces gas from the gas generator into the airbag, wherein the gas from the gas generator issues in non-axial directions relative to the duct and then flows along the axis in the duct.

In the occupant protection system according to the invention, when a vehicle gets into an emergency such as a collision, the gas generator emits a jet of gas, and the gas from the gas generator is introduced into the airbag through the duct to inflate the airbag. The seat cushion is pushed up or tossed from below by the inflated airbag to increase in density (or to be hardened), thereby preventing the forward movement of the waist of the occupant in the seat.

In the occupant protection system, even with a gas generator that emits a jet of gas in non-axial directions relative to the duct, the gas from the gas generator issues in the non-axial directions relative to the duct and then flows in the duct along the axis. Thus, the gas from the gas generator flows smoothly into the depth of the airbag (a portion furthermost from the duct) through the duct. Accordingly, the entire airbag inflates to restrain the occupant at an early stage.

BRIEF DESCRIPTION OF THE DRAWINGS

Embodiments of the present invention will be described hereinbelow with reference to the drawings, of which.

DETAILED DESCRIPTION OF THE PREFERRED EMBODIMENTS

Figure 1:
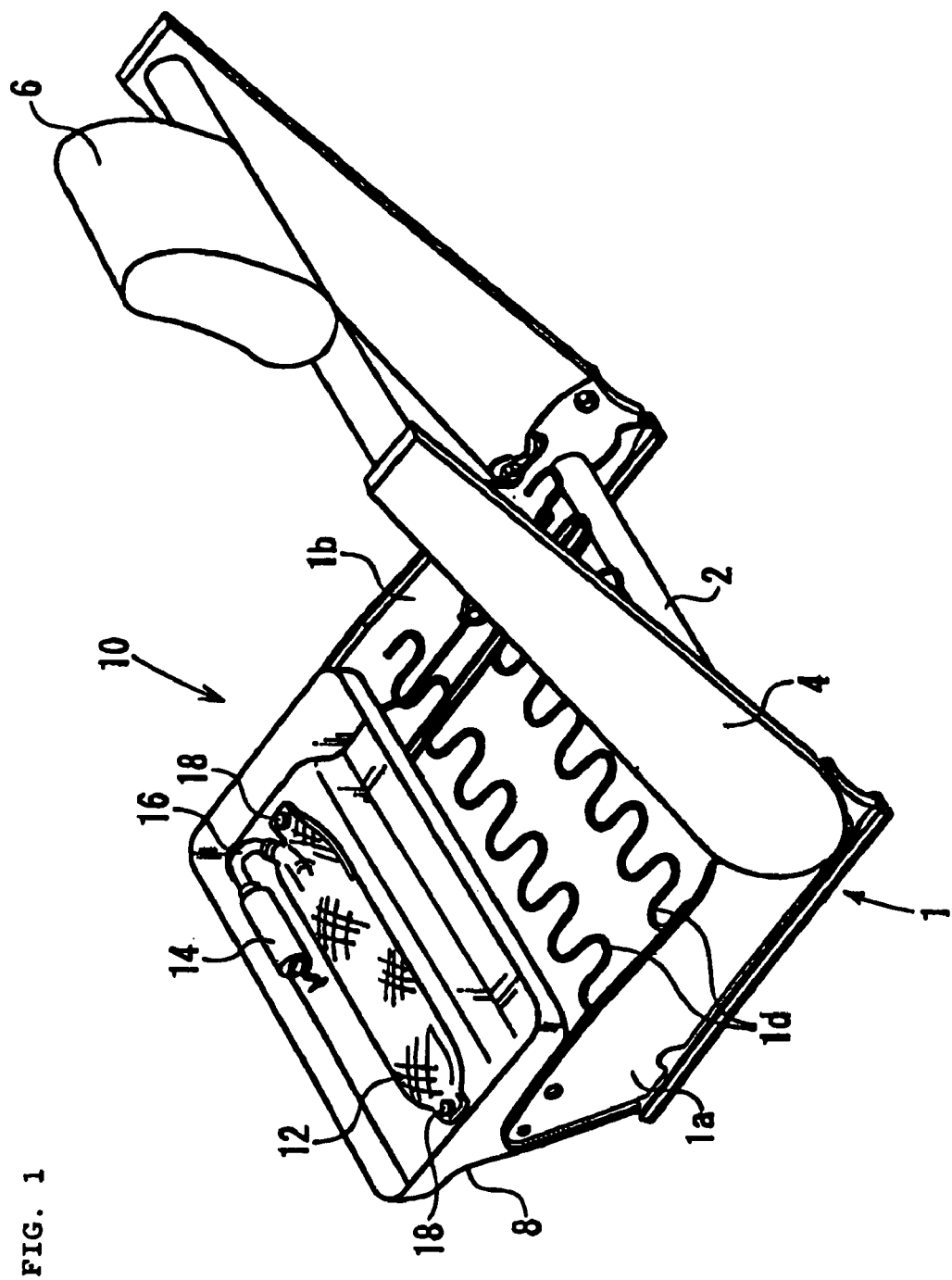
FIG. 1 is a perspective view of the frame of a seat including an occupant protection system according to an embodiment of the present invention.
Figure 2:
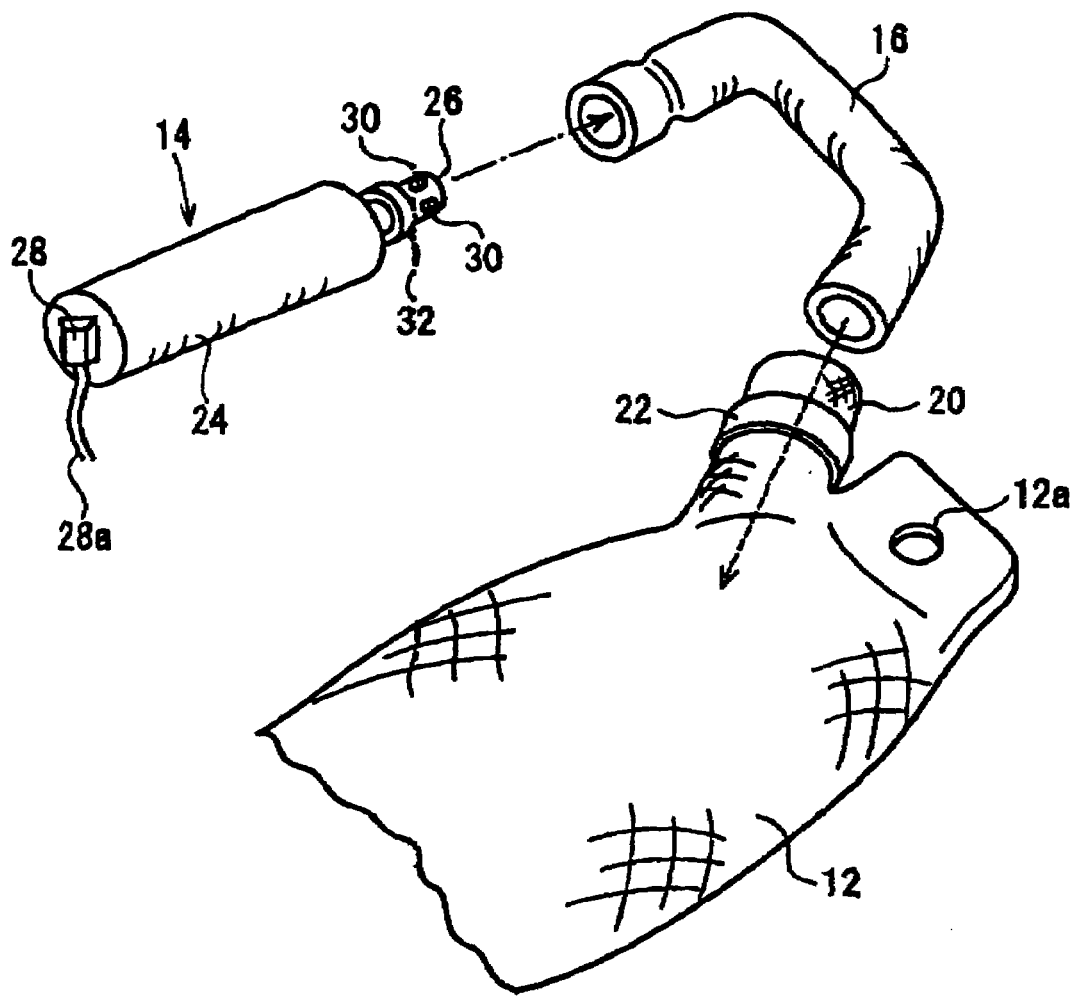
FIG. 2 is an exploded perspective view of the gas generator, the duct, and the airbag of the occupant protection system in FIG. 1.
Figure 3:
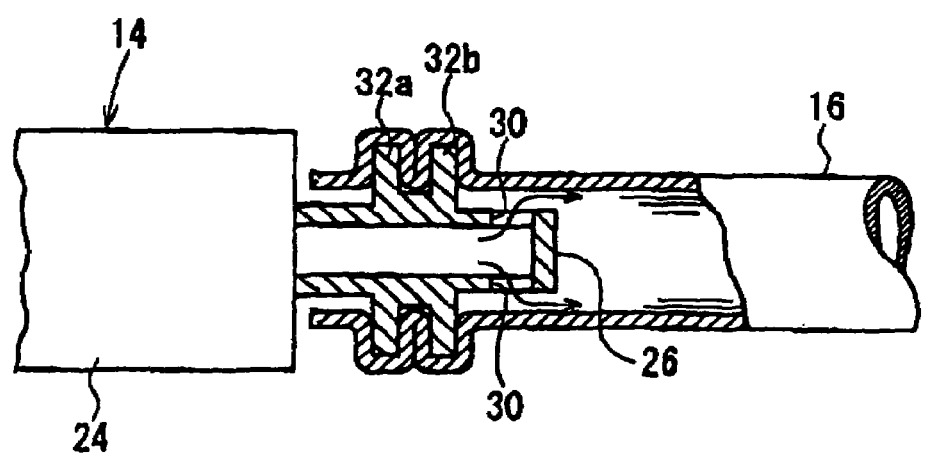
FIG. 3 is a cross-sectional view of the joint portion of the duct and the gas generator of the occupant protection system in FIG. 1.

FIG. 1 is a perspective view of the frame of a seat including an occupant protection system according to an embodiment of the present invention. FIG. 2 is an exploded perspective view of the gas generator, the duct, and the airbag of the occupant protection system. FIG. 3 is a cross-sectional view of the joint portion of the duct and the gas generator.

The frame of a car seat includes a base frame 1 and a back frame 4 rotatably joined to the base frame 1 via a support shaft 2 and a reclining device (not shown). A headrest 6 is mounted to the upper part of the back frame 4. The base frame 1 includes left and right side frames 1a and 1b. A seat pan 8 is disposed between the front parts of the side frames 1a and 1b.

Although not shown, the base frame 1 and the back frame 4 mount a seat cushion and a seat back made of urethane or the like. The seat pan 8 is disposed under the front of the seat cushion. Reference numeral 1d in FIG. 1 denotes a spring that supports the seat cushion.

An occupant protection system 10 includes an inflatable airbag 12 disposed on the seat pan 8 (under the front of the seat cushion), a gas generator 14 for inflating the airbag 12, and a duct 16 for introducing gas from the gas generator 14 into the airbag 12.

The airbag 12 extends along the lateral width of the seat pan 8 (along the width of the vehicle), right and left opposite ends of the airbag 12 being each fixed to the upper surface of the seat pan 8 with a bolt 18. Reference numeral 12a in FIG. 2 denotes bolt insertion holes provided at the right and left ends of the airbag 12. Each bolt 18 is screwed into the seat pan 8 through the bolt insertion holes 12a.

As shown in FIG. 2, the airbag 12 has a duct socket 20 at one end, into which one end of the duct 16 is inserted. The duct socket 20 is secured to the duct 16 with a band 22.

As shown in FIG. 2, the gas generator 14 includes a columnar main body 24 containing a gas generator, a tubular nozzle (gas port) 26 projecting from a first end (distal end) of the main body 24, and an initiator (gas-generator ignitor) 28 disposed at a second end of the main body (rear end) 24. Numeral 28a indicates a harness for passing electric current to the initiator 28.

As shown in FIG. 3, the distal end of the nozzle 26 is closed, around the side circumferential surface of which multiple gas ports 30 are provided at intervals. As shown in the drawing, the nozzle 26 is smaller in diameter than the inside diameter of the second end of the duct 16. Around the base end of the nozzle 26, a pair of duct-connecting flanges 32a and 32b (they are indicated by numeral 32 in FIG. 2) is provided along the axis of the nozzle 26 at intervals.

The second end of the duct 16 is fitted on the nozzle 26. The inner circumferential surface of the duct 16 faces the gas ports 30 around the side circumferential surface of the nozzle 26.

The second end of the duct 16 connects to the flanges 32a and 32b. In connection, the second end of the duct 16 is fitted onto the vicinity of the base end of the nozzle 26 (close to the base end relative to the flanges 32a and 32b) and then the end of the duct 16 is crimped or squeezed to be brought into close contact with the outer circumferential surface of the flanges 32a and 32b. At that time, the middle of the duct 16 is also brought into between the flanges 32a and 32b. Thus the second end of the duct 16 is connected to the flanges 32a and 32b.

As shown in FIG. 1, the gas generator 14 is placed on the seat pan 8 with the axis along the lateral width of the seat pan 8.

When a vehicle including the occupant protection system 10 with such a structure gets into an emergency such as a collision, the gas generator 14 emits a jet of gas, and the gas from the gas generator 14 is introduced into the airbag 12 through the duct 16 to inflate the airbag 12. The seat cushion is pushed up or tossed from below by the inflated airbag 12 to increase in density (or to be hardened), thereby preventing the forward movement of the waist of the occupant in the seat.

In this occupant protection system 10, the duct 16 is fitted on the nozzle 26 of the gas generator 14, so that the inner circumferential surface of the duct 16 faces the gas ports 30 around the side circumferential surface of the nozzle 26. Accordingly, when the gas generator 14 emits a jet of gas, the gas from the gas generator 14 issues radially from the gas ports 30 relative to the nozzle 26, and then strikes against the inner circumferential surface of the duct 16 to change in direction, thus flowing along the axis of the duct 16.

The gas from the gas generator 14 thus flows smoothly through the duct 16 into the depth of the airbag 12 (a portion furthermost from the duct 16). As a result, the entire airbag 12 inflates to restrain the occupant at an early stage.

According to the embodiment, the duct-connecting flange 32 (32a and 32b) is provided at the base end of the nozzle 26 of the gas generator 14, to which the duct 16 is secured by crimping or squeezing, thereby joining the duct 16 and the gas generator 14 together. The joint structure of the duct and the gas generator may be another.

Figure 4:
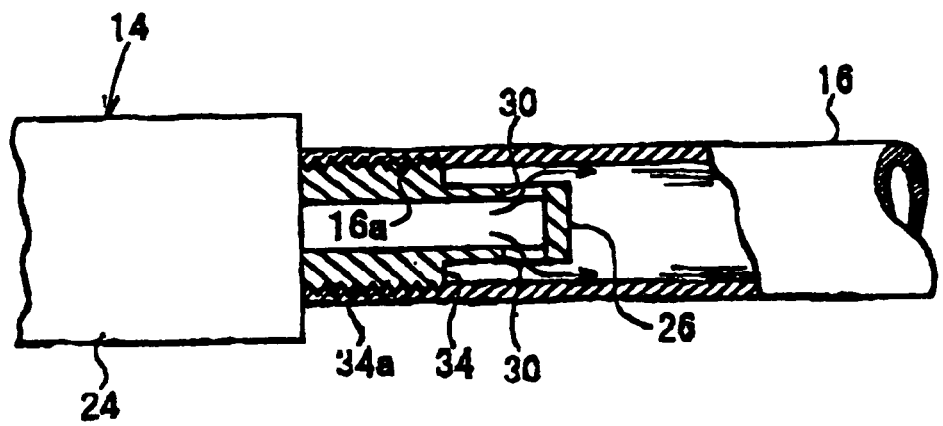
FIG. 4 is a cross-sectional view of the joint structure of the duct and the gas generator of an occupant protection system according to another embodiment.

FIG. 4 is a cross-sectional view showing another joint structure of the duct and the gas generator.

In this embodiment, at the base end of the nozzle 26 of the gas generator 14 is provided a large-diameter portion having an outer diameter substantially equal to the inner diameter of the duct 16. The large-diameter portion has a male screw 34a around the outer circumferential surface thereof. A female screw 16a that is to be screwed onto the male screw 34a is provided around the inner circumferential surface of the end of the duct 16.

According to this embodiment, the nozzle 26 is inserted into the duct 16 to screw the male screw 34a into the female screw 16a; thus the gas generator 14 and the duct 16 are joined together.

The other structure of the embodiment is the same as that of the embodiment in FIGS. 1 to 3; the same numerals as those of FIGS. 1 to 3 indicate the same components.

Figure 5:
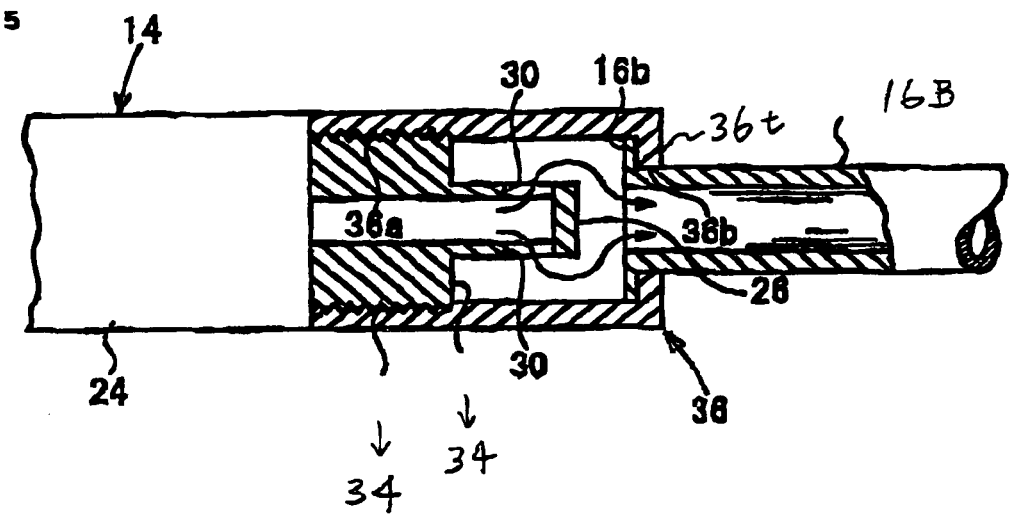
FIG. 5 is a cross-sectional view of the joint structure of the duct and the gas generator of an occupant protection system according to still another embodiment.
Figure 6:
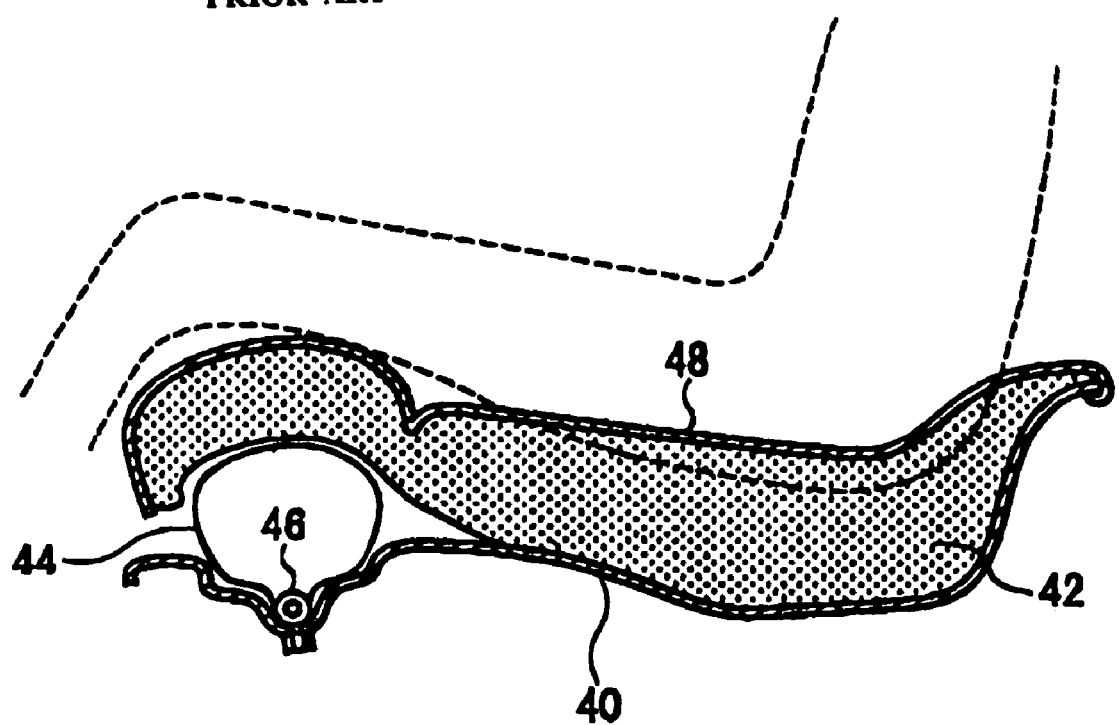
FIG. 6 is a sectional view of an occupant protection system of a related art.

FIG. 5 is a cross-sectional view of still another joint structure of the duct and the gas generator.

According to this embodiment, at the end of the gas generator 14 is placed a head cap 36 that surrounds the nozzle 26. The head cap 36 connects to the duct 16.

Also in this embodiment, at the base end of the nozzle 26 is provided a large-diameter portion 34 substantially equal in an outer diameter to the inner diameter of the opening at the rear of the head cap 36. Around the side circumferential surface of the large-diameter portion 34 is provided a male screw 34a. Around the inner circumferential surface of the rear opening of the head cap 36 is provided a female screw 36a that is to be screwed on the male screw 34a. The head cap 36 is placed on the nozzle 26 and the male screw 34a is screwed into the female screw 36a; thus, the head cap 36 is fixed to the end of the gas generator 14.

In the end face of the head cap 36 is provided an opening 36b. A collar 36t is provided around the inner rim of the opening 36b, through which a duct 16B passes. Around the outer rim of the end of the duct 16B is provided a flange 16b. The flange 16b is placed on the collar 36t from the inside of the head cap 36 and fixed together by welding or the like.

The other structure of the embodiment is the same as that of the embodiment in FIGS. 1 to 3.

According to this embodiment, when the gas generator 14 emits a jet of gas, the gas from the gas generator 14 first issues into the head cap 36, and then flows into the duct 16B through the head cap 36. Thus, also in this embodiment, the gas from the gas generator 14 flows in the duct 16B along the axis of the duct 16B. The gas therefore flows smoothly into the depth of the airbag 12 through the duct 16B.

FIG. 7(a) is a longitudinal sectional view showing the joint structure of a gas generator and a duct according to another embodiment; and FIG. 7(b) is a cross-sectional view taken along line B-B of FIG. 7(a).

The gas generator 14A includes, like the gas generator 14, an approximately columnar main body 24A and a cylindrical nozzle 26A projecting from the distal end of the main body 24A. The nozzle 26A is sealed at the end face, and has multiple gas ports 30A around the side circumference. A male-screw axial rod 38 projects from the distal end of the nozzle 26A.

The gas generator 14A and the duct 16 are joined together via an adapter 50. The adapter 50 includes a cylinder 52, a partition wall 54 disposed in the vicinity of the axial center in the cylinder 52 with the plate surface disposed radially, a central hole 56 disposed in the center of the partition wall 54, and multiple gas openings 58 around the central hole 56 of the partition wall 54.

The adapter 50 and the gas generator 14A are joined together in such a manner that the male-screw axial rod 38 is inserted into the central hole 56 of the adapter 50, and a nut 60 is tightened to the male-screw axial rod 38, with the base end of the cylinder 52 fitted around the main body 24A of the gas generator 14A via a packing 62 such as an O ring. A female screw 50a is cut around the inner circumference of the distal end of the cylinder 52. The male screw 16a' of the duct 16 is screwed into the female screw 50a, so that the duct 16 is joined to the gas generator 14A via the adapter 50.

Figure 7:
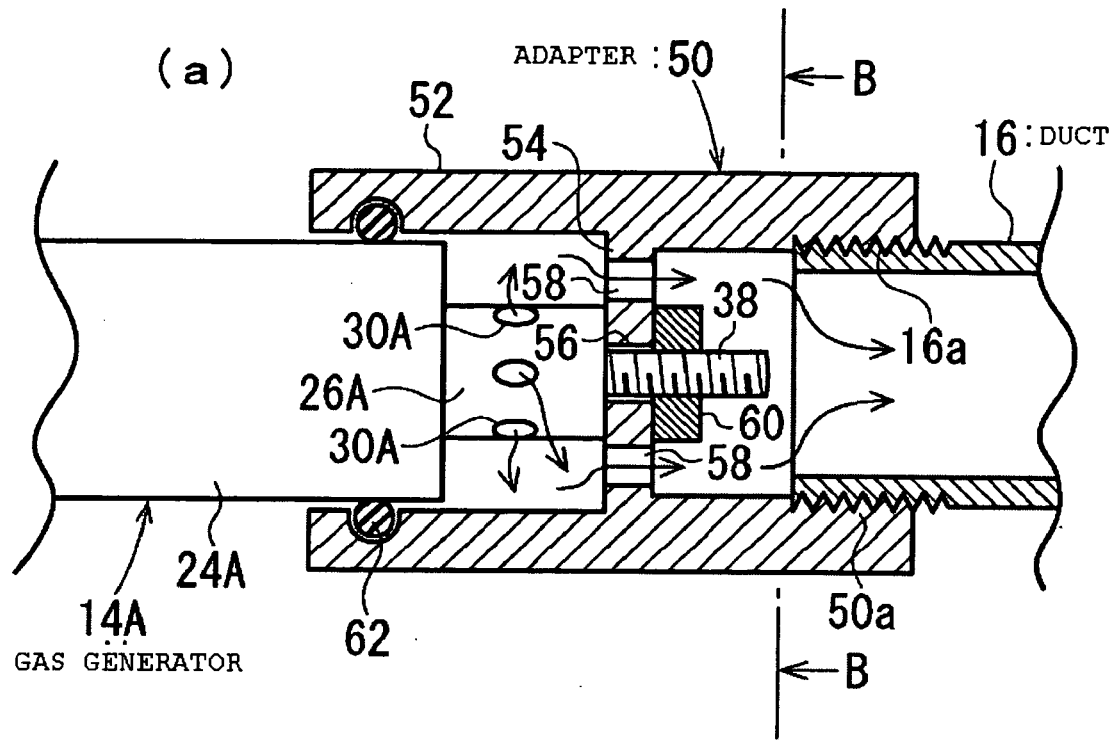
FIG. 7 includes sectionals views of the joint structure of a duct and a gas generator according to another embodiment.
Figure 7:
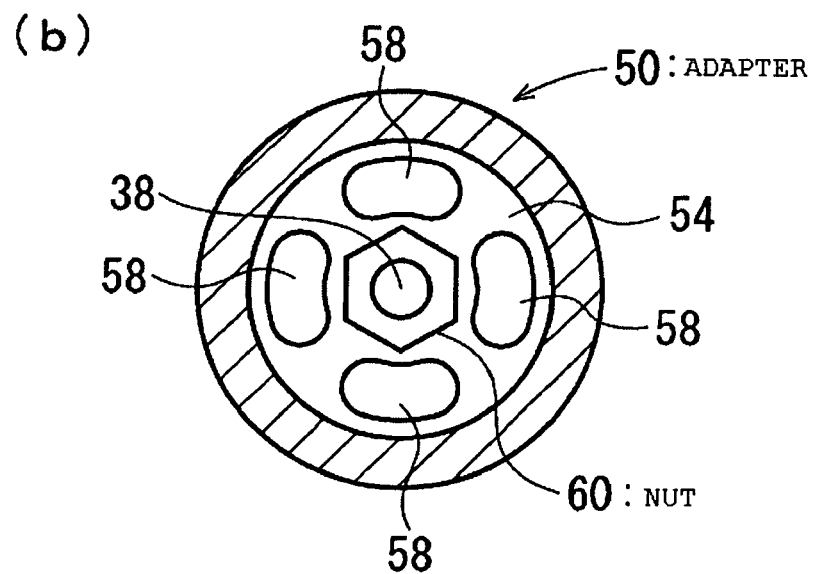

In FIG. 7, the packing 62 is interposed between the inner circumference of the cylinder 52 and the outer circumference of the main body 24A of the gas generator 14A. Alternatively, like an adapter 50A of FIG. 8, a collar 64 may be provided around the inner circumference of the cylinder 52, and a packing 66 may be interposed between the collar 64 and the distal end face of the main body 24A.

Figure 8:
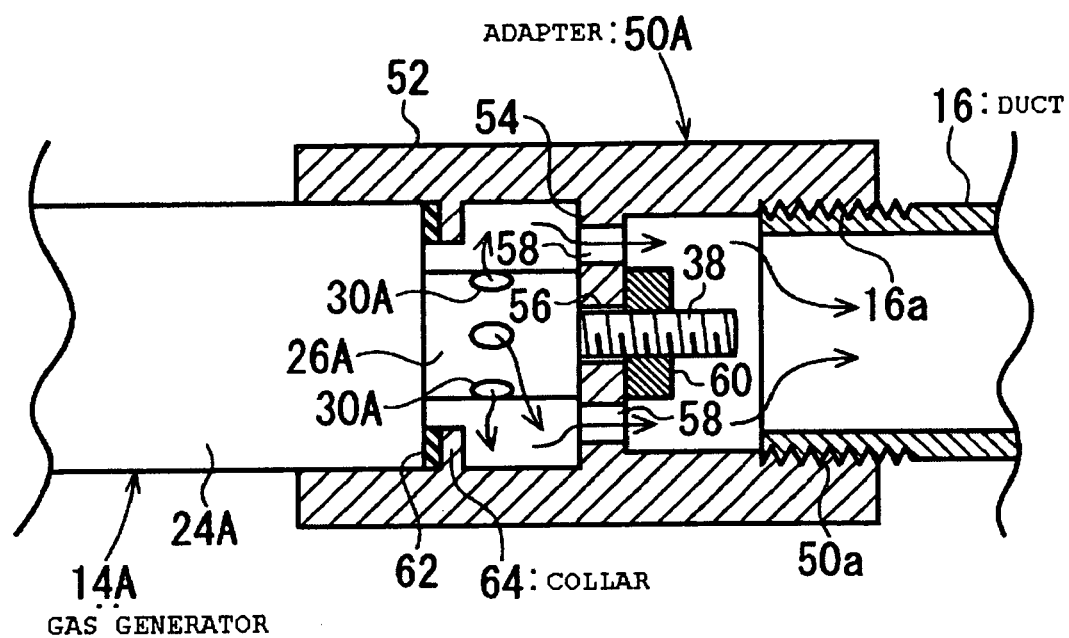
FIG. 8 is a sectional view of the joint structure of a duct and a gas generator according to yet another embodiment.

The other structure of FIG. 8 is the same as that of FIG. 7(a), wherein the same reference numerals indicate the same components.

In FIGS. 7 and 8, the duct 16 is joined to the cylinder 52 via the male screw 16a'. Alternatively, it is possible to provide a flange similar to the flange 16b of the duct 16B in FIG. 5 at the distal end of the duct 16, provide a collar similar to the collar 36t of the head cap 36 in FIG. 5 at the distal end of the cylinder 52, and join the adapter 50A and the duct 16 together by bringing the flange and the collar into engagement with each other.

It is to be understood that the foregoing embodiments are only examples of the invention and the invention is not limited to the foregoing embodiments.

What is claimed is:

1. An occupant protection system comprising:
   a seat airbag for lifting a vehicle seat with airbag inflation;
   a gas generator outside of and spaced from the seat airbag, the gas generator generating hot inflation gas with the gas generator having a plurality of gas ports arranged so that inflation gas is emitted radially therefrom for inflating the airbag in vehicle emergency conditions;
   an elongate duct extending outside the seat airbag and between the seat airbag and the gas generator for delivering inflation gas to the airbag with the inflation gas flowing axially through the elongate duct and axially out from the duct into the airbag;
   a connector member extending between and interconnecting the gas generator and the elongate duct; and
   a chamber in the connector member that is configured to receive the radially emitted inflation gas from the gas ports of the gas generator and to redirect the inflation gas to flow axially into the elongate duct.

2. The occupant protection system of claim 1 wherein the gas generator has a nozzle portion including the gas ports that is outside the airbag.

3. The occupant protection system of claim 2 wherein the duct includes an inlet portion, and the connector member connects the gas generator nozzle portion and duct inlet portion to secure the duct to the gas generator outside and spaced from the airbag.

4. The occupant protection system of claim 2 wherein the connector member is a cap or adapter member.

5. The occupant protection system of claim 4 wherein the cap or adapter member and the gas generator nozzle portion, and the cap or adapter member and the duct have cooperating structure to secure the duct to the gas generator with the cap or adapter member extending therebetween outside and spaced from the airbag.

6. The occupant protection system of claim 1 wherein the connector member and one of the gas generator and the elongate duct have a threaded connection therebetween that is outside the airbag.

7. The occupant protection system of claim 1 wherein the elongate duct has an outlet end and the airbag has an inlet socket with the duct outlet and the airbag socket configured to receive the axial flow of inflation gas from the duct in the same direction into the airbag for smooth inflation gas flow into the airbag.

8. A vehicle seat airbag system comprising:
   a vehicle seat having a seat cushion;
   an airbag disposed under the seat cushion;
   a gas generator for generating inflation gas to inflate the airbag and lift up the seat cushion in emergency conditions;
   a reduced size nozzle portion of the gas generator having an axial end wall and a side circumferential surface including gas ports therein and spaced thereabout so that inflation gas only flows radially out from the nozzle portion through the gas ports thereof; and
   a duct assembly extending between the nozzle portion and the airbag under the seat cushion, the duct assembly having an inner circumferential surface of a larger diameter than the nozzle side circumferential surface and extending thereabout with the inner circumferential surface being adjacent to and facing the nozzle side circumferential surface including the gas ports therein to form an annular space between the duct assembly and nozzle portion circumferential surfaces in which the gas flowing generally radially from the gas generator nozzle portion is redirected to flow generally axially in the duct assembly and into the airbag for smooth inflation gas flow into the airbag.

9. The vehicle seat airbag system of claim 8 wherein the duct assembly has an elongate tubular wall of predetermined length with the tubular wall extending for substantially the entire length thereof outside of the airbag.

10. The vehicle seat airbag system of claim 8 wherein the duct assembly has an elongate, bent configuration.

11. The vehicle seat airbag system of claim 8 wherein the duct assembly has an inlet end and an outlet end spaced from each other so the inlet end is outside the airbag.

12. The vehicle seat airbag system of claim 11 wherein the duct inlet end and the gas generator nozzle portion have one of a flanged and threaded connection therebetween.

13. The vehicle seat airbag system of claim 11 wherein the duct assembly includes a cap or adapter member including the inner circumferential surface and being connected to the gas generator nozzle portion outside the airbag.

14. The vehicle seat airbag system of claim 13 wherein the adapter member has inlet and outlet chambers, the annular space being in the inlet chamber, and a partition wall therebetween having at least one gas opening therein configured so that inflation gas radially emitted into the inlet chamber flows through the gas opening into the outlet chamber in a generally axial direction.

15. The vehicle seat airbag system of claim 8 wherein the gas generator and the duct assembly are under the seat cushion.

* * * * *